(12) United States Patent
Mitsuya et al.

(10) Patent No.: US 7,626,638 B2
(45) Date of Patent: Dec. 1, 2009

(54) APPARATUS AND METHOD FOR PROCESSING VIDEO SIGNAL

(75) Inventors: Kota Mitsuya, Fukaya (JP); Hideo Tsurufusa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 813 days.

(21) Appl. No.: 11/366,395

(22) Filed: Mar. 3, 2006

(65) Prior Publication Data

US 2006/0215056 A1    Sep. 28, 2006

(30) Foreign Application Priority Data

Mar. 4, 2005    (JP) .............................. 2005-061436

(51) Int. Cl.
*H04N 1/393*  (2006.01)
*H04N 9/74*  (2006.01)
(52) U.S. Cl. .................... 348/581; 348/569; 348/561; 348/704; 348/589; 382/298; 345/660; 715/815
(58) Field of Classification Search ................ 348/581, 348/561, 569, 704, 589, 600; 345/660, 472; 382/298; 715/815, 800
See application file for complete search history.

(56) References Cited

U.S. PATENT DOCUMENTS

| | | | | |
|---|---|---|---|---|
| 6,795,125 | B2* | 9/2004 | Yui | 348/564 |
| 7,050,113 | B2* | 5/2006 | Campisano et al. | 348/581 |
| 7,489,363 | B2* | 2/2009 | Choi | 348/581 |
| 2004/0130663 | A1* | 7/2004 | Park | 348/569 |
| 2004/0165113 | A1* | 8/2004 | Kim et al. | 348/564 |

FOREIGN PATENT DOCUMENTS

| | | |
|---|---|---|
| JP | 2003-153115 | 5/2003 |
| JP | 2003-333455 | 11/2003 |
| JP | 2004-221750 | 8/2004 |

* cited by examiner

*Primary Examiner*—David L Ometz
*Assistant Examiner*—Jean W Désir
(74) *Attorney, Agent, or Firm*—Finnegan, Henderson, Farabow, Garrett & Dunner, L.L.P.

(57) ABSTRACT

According to one embodiment, an input analog video signal is digitized, and an OSD signal to which a second scaling process is performed is added to the digital video signal to which a first scaling process is performed. At this point, display modes of the digital video signal and the OSD signal are changed by causing pieces of scaling data, supplied for the first and second scaling processes, to be variable based on a predetermined operation.

9 Claims, 9 Drawing Sheets

| Panel specification | Horizontal direction scaling data | Vertical direction scaling data |
|---|---|---|
| WXGA | ○○○○ | ○○○○ |
| XGA | ○○○○ | ○○○○ |
| VGA | ○○○○ | ○○○○ |
| 720p | ○○○○ | ○○○○ |
| ⋮ | ⋮ | ⋮ |

APPARATUS AND METHOD FOR PROCESSING VIDEO SIGNAL

CROSS-REFERENCE TO RELATED APPLICATIONS

This application is based upon and claims the benefit of priority from Japanese Patent Application No. 2005-061436, filed Mar. 4, 2005, the entire contents of which are incorporated herein by reference.

BACKGROUND

1. Field

One embodiment of the invention relates to a video signal processing apparatus and video signal processing method preferably used in a television broadcasting receiver and the like which can receive both analog television broadcasting and digital television broadcasting.

2. Description of the Related Art

Recently, as is well known, digitalization of the television broadcasting has been promoted. For example, not only satellite digital broadcasting such as BS (broadcasting satellite) digital broadcasting and 110 CS (communication satellite) digital broadcasting but also terrestrial digital broadcasting are started in Japan.

Therefore, it is desirable that the current television broadcasting receiver include both a function of receiving and watching the existing analog television broadcasting and a function of receiving and watching the satellite digital broadcasting and the terrestrial digital broadcasting.

In such television broadcasting receivers, digital graphics data for on screen display (OSD) is previously prepared, and the digital graphics data is commonly used in receiving the analog television broadcasting and in receiving the digital television broadcasting.

In this case, OSD video by the digital graphics data is superimposed on display video of the analog television broadcasting. In superimposing the digital graphics data, it is important to provide a configuration in which more efficient and free display mode can be realized without causing degradation of image quality and the like, and user's handling is easy enough for practical use.

Jpn. Pat. Appln. KOKAI Publication No. 2003-153115 discloses a configuration in which data concerning an aspect ratio of a display screen is obtained from a video display apparatus, OSD display data to be outputted to the video display apparatus is optimized based on the obtained data concerning the aspect ratio, and the optimized display data mixed with video data is outputted to the video display apparatus.

Jpn. Pat. Appln. KOKAI Publication No. 2003-333455 discloses a broadcasting receiver provided with a video processing/OSD circuit in which video data is generated based on directed character information or color information, upper and lower band portions or right and left band portions (side panel) are removed in the video based on the direction, and the video is horizontally or vertically magnified.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an input analog video signal is digitized, and an OSD signal to which a second scaling process is performed is added to the digital video signal to which a first scaling process is performed. At this point, display modes of the digital video signal and the OSD signal are changed by causing pieces of scaling data, supplied for the first and second scaling processes, to be variable based on a predetermined operation.

Figure 1:
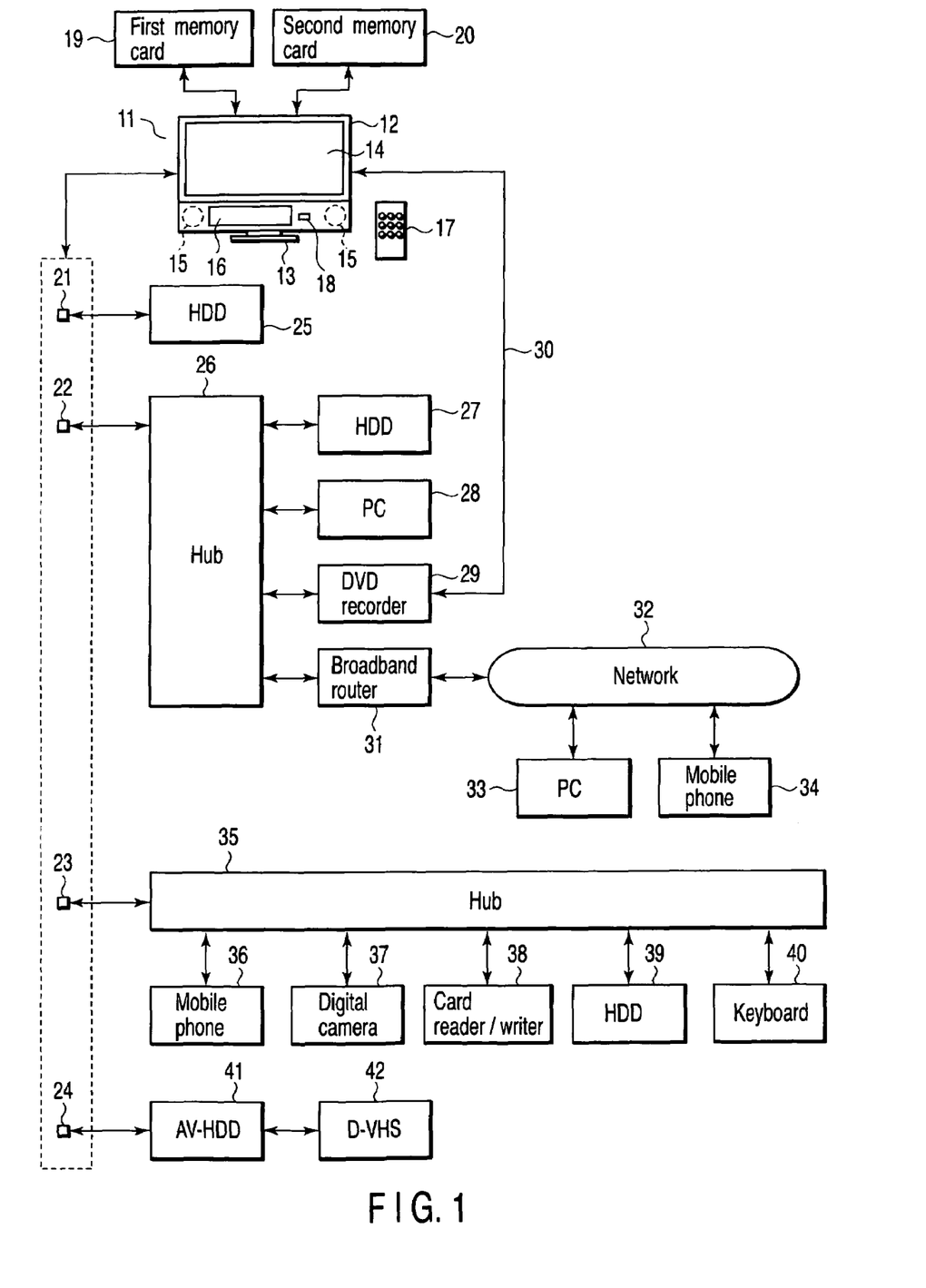
FIG. 1 shows an embodiment of the invention, and schematically shows a digital television broadcasting receiver and an example of a network system mainly formed thereby.

FIG. 1 schematically shows an appearance of a digital television broadcasting receiver 11 described in the embodiment and an example of a network system mainly formed by the digital television broadcasting receiver 11.

The digital television broadcasting receiver 11 mainly includes a thin-shaped cabinet 12 and a support board 13 which supports the cabinet 12 while making the cabinet 12 uprising. The cabinet 12 includes a flat-panel type video display unit 14, a speaker 15, an operation unit 16, and a photo-receiving unit 18. For example, the video display unit 14 includes a liquid crystal display panel. The photo-receiving unit 18 receives operation information transmitted from a remote controller 17.

A first memory card 19 such as a secure digital (SD) memory card and multi-media card (MMC) is detachably attached to the digital television broadcasting receiver 11, and information such as a program and a photograph is recorded in and reproduced from the first memory card 19.

A second memory card (integrated circuit (IC) card) 20 is also detachably attached to the digital television broadcasting receiver 11, and the information is recorded in and reproduced from the second memory card 20. A semiconductor memory in which contract information and the like, for example, are recorded is incorporated into the second memory card 20.

The digital television broadcasting receiver 11 includes a first local area network (LAN) terminal 21, a second LAN terminal 22, a universal serial bus (USB) terminal 23, and an i.Link terminal 24.

The first LAN terminal 21 is used as a LAN-compatible hard disk drive (HDD) dedicated port, and used to perform the recording and reproduction of the information to a LAN-compatible HDD 25 which is the connected network attached storage (NAS) through Ethernet (registered trademark).

Thus, the provision of the first LAN terminal 21 as the LAN-compatible HDD dedicated port enables program information to be stably recorded in the HDD 25 with high-definition image quality without being influenced by other network environments, network use status and the like.

The second LAN terminal 22 is used as a general LAN-compatible port for utilizing the Ethernet (registered trademark). For example, the second LAN terminal 22 is used to connect devices such as a LAN-compatible HDD 27, a personal computer (PC) 28, an HDD-built-in DVD recorder 29 to the digital television broadcasting receiver 11 through a hub 26 to perform information transmission with the devices.

For the DVD recorder 29, since the digital information communicated through the second LAN terminal 22 is the information only on a control system, it is necessary to provide a dedicated analog transmission line 30 in order to transmit analog video and sound information with the digital television broadcasting receiver 11.

The second LAN terminal 22 is connected to a network 32 such as the Internet through a broadband router 31 connected to the hub 26, and used to perform the information transmission with a PC 33, a mobile phone 34, and the like through the network 32.

The USB terminal 23 is used as a general USB-compatible port. For example, the USB terminal 23 is connected to USB devices such as a mobile phone 36, a digital camera 37, a card reader/writer 38 for the memory card, an HDD 39, and a keyboard 40 through a hub 35, and used to perform the information transmission with the USB devices.

The i.Link terminal 24 establishes serial connection with, e.g., an AV-HDD 41, a digital (D)-video home system (VHS) 42, and a terrestrial digital tuner (not shown) to perform the information transmission with these devices.

Figure 2:
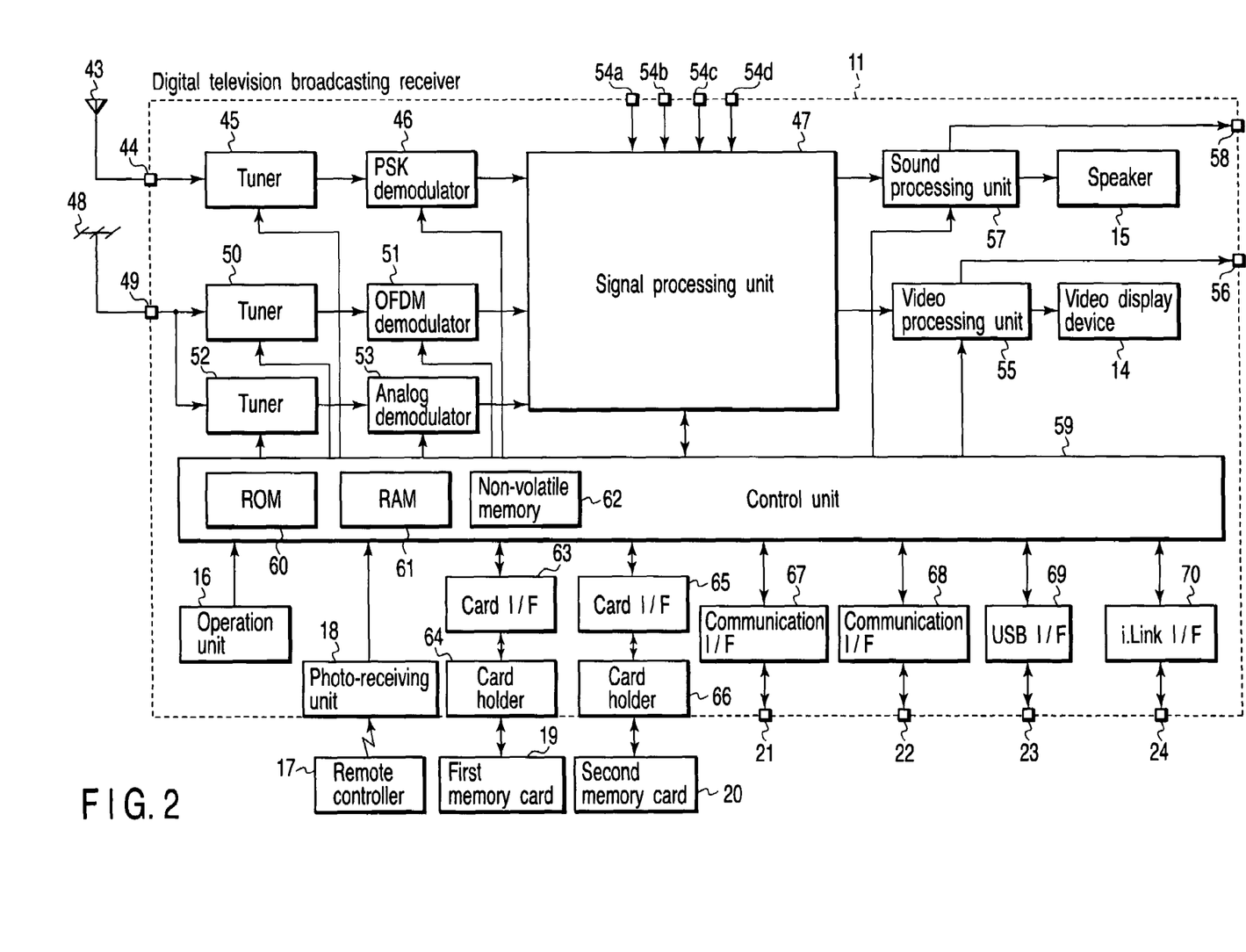
FIG. 2 is a block diagram showing a main signal processing system of the digital television broadcasting receiver in the embodiment.

FIG. 2 shows a main signal processing system of the digital television broadcasting receiver 11. A satellite digital television broadcasting signal received by a BS/CS digital broadcasting receiving antenna 43 is supplied to a satellite digital broadcasting tuner 45 through an input terminal 44 to select the broadcasting signal of the desired channel.

The broadcasting signal selected by the tuner 45 is supplied to a phase shift keying (PSK) demodulator 46, and the broadcasting signal is demodulated in the digital video signal and the digital sound signal. Then, the digital video signal and the digital sound signal are outputted to a signal processing unit 47.

A terrestrial digital television broadcasting signal received by a terrestrial broadcasting receiving antenna 48 is supplied to a terrestrial digital broadcasting tuner 50 through an input terminal 49 to select the broadcasting signal of the desired channel.

The broadcasting signal selected by the tuner 50 is supplied to an orthogonal frequency division multiplexing (OFDM) demodulator 51, and the broadcasting signal is demodulated in the digital video signal and the digital sound signal. Then, the digital video signal and the digital sound signal are outputted to the signal processing unit 47.

A terrestrial analog television broadcasting signal received by the terrestrial broadcasting receiving antenna 48 is supplied to a terrestrial analog broadcasting tuner 52 through the input terminal 49 to select the broadcasting signal of the desired channel. The broadcasting signal selected by the tuner 52 is supplied to an analog demodulator 53, and the broadcasting signal is demodulated in the analog video signal and the analog sound signal. Then, the analog video signal and the analog sound signal are outputted to the signal processing unit 47.

The signal processing unit 47 is connected to plural input terminals 54a, 54b, 54c, and 54d (four input terminals in FIG. 2). The input terminals 54a to 54d enable the analog video signal and the analog sound signal to be inputted from the outside of the digital television broadcasting receiver 11.

The signal processing unit 47 selectively performs predetermined digital signal processing to the digital video signals and the digital sound signals, which are supplied from the PSK demodulator 46 and the OFDM demodulator 51, respectively.

The signal processing unit 47 selectively digitizes the analog video signals and the sound signals, which are supplied from the analog demodulator 53 and the input terminals 54a to 54d, respectively, and the signal processing unit 47 performs the predetermined digital signal processing to the digitized video signals and the digitized sound signals.

Examples of the digital signal processing performed by the signal processing unit 47 include an MPEG decoding process for the video signal, an MPEG noise reduction process of decreasing a mosquito noise generated in association with the MPEG decoding process, a process of superimposing an OSD digital graphics data (hereinafter referred to as OSD signal) on the video signal, a scaling process for the video signal, and a decoding process for the sound signal.

The digital video signal outputted from the signal processing unit 47 is supplied to a video processing unit 55. After the video processing unit 55 converts the inputted digital video signal into the analog video signal having a format which can be displayed by the video display unit 14, the video processing unit 55 derives the analog video signal to the outside through an output terminal 56 while outputting the analog video signal to the video display unit 14 to perform the video display.

The digital sound signal outputted from the signal processing unit 47 is supplied to a sound processing unit 57. After the sound processing unit 57 converts the inputted digital sound signal into the analog sound signal having the format which can be reproduced by the speaker 15, the sound processing unit 57 derives the analog sound signal to the outside through an output terminal 58 while outputting the analog sound signal to the speaker 15 to reproduce the sound.

A control unit 59 controls the whole operations including the above various receiving operations of the digital television broadcasting receiver 11. A central processing unit (CPU) and the like are built in the control unit 59. The control unit 59 receives operation information from the operation unit 16 or receives operation information sent from the remote controller 17 through the photo-receiving unit 18, and the control unit 59 controls each unit such that contents of the operation are reflected.

In this case, the control unit 59 mainly utilizes a read only memory (ROM) 60 in which a control program executed by the CPU is stored, a random access memory (RAM) 61 which supplies a working area to the CPU, and a non-volatile memory 62 in which various kinds of setting information and control information are stored.

The control unit 59 is connected to a card holder 64 through a card interface (I/F) 63. The first memory card 19 can be attached to the card holder 64. Therefore, the control unit 59 can perform the information transmission with the first memory card 19 attached to the card holder 64 through the card I/F 63.

The control unit 59 is connected to a card holder 66 through a card I/F 65. The second memory card 20 can be attached to the card holder 66. Therefore, the control unit 59 can perform the information transmission with the second memory card 20 attached to the card holder 66 through the card I/F 65.

The control unit 59 is connected to the first LAN terminal 21 through a communication I/F 67. Therefore, the control unit 59 can perform the information transmission with the LAN-compatible HDD 25 connected to the first LAN terminal 21 through the communication I/F 67. In this case, the control unit 59 has a dynamic host configuration protocol (DHCP) server function, and the control unit 59 performs the control while allocating an internet protocol (IP) address to the LAN-compatible HDD 25 connected to the first LAN terminal 21.

The control unit 59 is connected to the second LAN terminal 22 through a communication I/F 68. Therefore, the control unit 59 can perform the information transmission with the devices (see FIG. 1) connected to the second LAN terminal 22 through the communication I/F 68.

The control unit 59 is connected to the USB terminal 23 through the USB I/F 69. Therefore, the control unit 59 can perform the information transmission with the devices (see FIG. 1) connected to the USB terminal 23 through the USB I/F 69.

The control unit 59 is connected to the i.Link terminal 24 through an i.Link I/F 70. Therefore, the control unit 59 can perform the information transmission with the devices (see FIG. 1) connected to the i.Link terminal 24 through the i.Link I/F 70.

Figure 3:
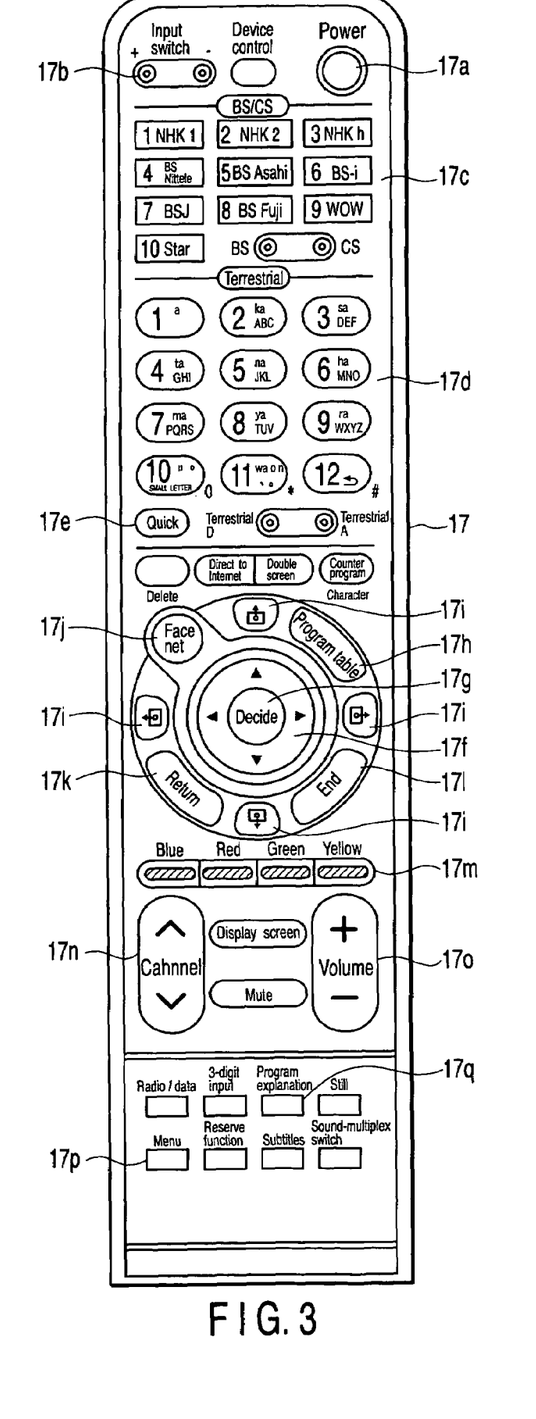
FIG. 3 shows a remote controller of the digital television broadcasting receiver in the embodiment.

FIG. 3 shows an appearance of the remote controller 17. The remote controller 17 mainly includes a power key 17a, an input switch key 17b, a satellite digital broadcasting channel direct selection key 17c, a terrestrial broadcasting channel direct selection key 17d, a quick key 17e, a cursor key 17f, a decision key 17g, a program table key 17h, a page switch key 17i, a face net (navigation) key 17j, a return key 17k, an end key 17l, blue, red, green, and yellow color keys 17m, a channel up and down key 17n, a volume adjustment key 17o, a menu key 17p, and a program explanation key 17q.

Figure 4:
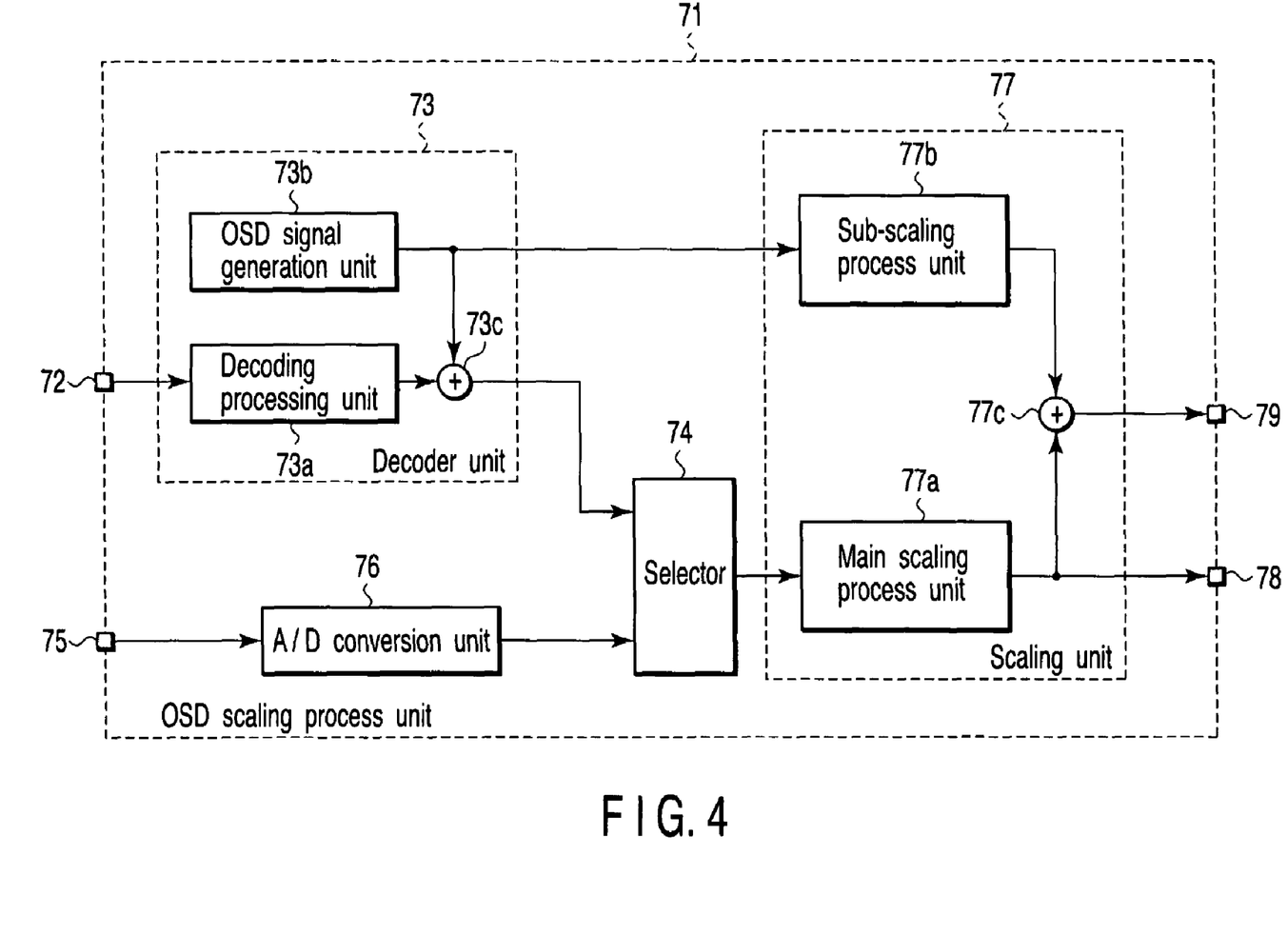
FIG. 4 is a block diagram showing an OSD scaling process unit of the digital television broadcasting receiver in the embodiment.

The process of superimposing the OSD signal which is the OSD digital video signal on the video signal and the scaling process to the video signal, performed by the signal processing unit 47, will be described below. As shown in FIG. 4, these processes are performed by an OSD scaling process unit 71 included in the signal processing unit 47.

The digital video signal supplied through either the PSK demodulator 46 or the OFDM demodulator 51 is supplied to a decoder unit 73 through an input terminal 72. The decoder unit 73 is formed in an IC chip, and has a decoding processing unit 73a, an OSD signal generation unit 73b, and an addition unit 73c. The decoding processing unit 73a performs a predetermined decoding process to the inputted digital video signal. The OSD signal generation unit 73b generates the OSD signal. The addition unit 73c adds the OSD signal, outputted from the OSD signal generation unit 73b, to the digital video signal outputted from the decoding processing unit 73a. The addition unit 73c outputs the digital video signal to which the OSD signal is added, and the digital video signal is supplied to one of input terminals of a selector 74.

The analog video signal supplied through either the analog demodulator 53 or each of the input terminals 54a to 54d is supplied to an A/D conversion unit 76 through an input terminal 75, and the A/D conversion unit 76 converts the analog video signal into the digital video signal. Then, the digital video signal is supplied to the other input terminal of the selector 74.

The selector 74 selectively supplies the digital video signal to which the OSD signal is added outputted from the decoder unit 73 and the digital video signal outputted from the A/D conversion unit 76 to a scaling unit 77.

The scaling unit 77 is formed in an IC chip, and has a main scaling process unit 77a, a sub-scaling process unit 77b, and an addition unit 77c. The main scaling process unit 77a performs the scaling process to the digital video signal supplied from the selector 74. The sub-scaling process unit 77b performs the scaling process to the OSD signal outputted from the OSD signal generation unit 73b of the decoder unit 73. The addition unit 77c adds the OSD signal, outputted from the sub-scaling process unit 77b, for example, in a chroma key to the digital video signal outputted from the main scaling process unit 77a.

In this case, it is assumed that the main scaling process unit 77a can perform the high-quality scaling process compared with the sub-scaling process unit 77b. In other words, the sub-scaling process unit 77b is lower than the main scaling process unit 77a in the quality of the scaling process.

The digital video signal outputted from the main scaling process unit 77a is taken out to the outside of the OSD scaling process unit 71 through an output terminal 78, and the digital video signal outputted from the addition unit 77c is taken out to the outside of the OSD scaling process unit 71 through an output terminal 79.

In receiving the digital broadcasting, after the decoding processing unit 73a performs the decoding process to the digital video signal supplied to the input terminal 72, the digital video signal is outputted to the main scaling process unit 77a through the selector 74, and the main scaling process unit 77a performs the scaling process to the digital video signal. Then, the digital video signal is derived from the output terminal 78.

In performing the superimposing display of the OSD video, the OSD signal generation unit 73b generates the OSD signal, and the addition unit 73c adds the OSD signal to the digital video signal outputted from the decoding processing unit 73a. The digital video signal to which the OSD signal is added is outputted to the main scaling process unit 77a through the selector 74, and the main scaling process unit 77a performs the scaling process to the digital video signal. Then, the digital video signal is derived from the output terminal 78.

In receiving the analog television broadcasting, after the A/D conversion unit 76 digitizes the analog video signal supplied to the input terminal 75, the digital video signal is outputted to the main scaling process unit 77a through the selector 74, and the main scaling process unit 77a performs the scaling process to the digital video signal. Then, the digital video signal is derived from the output terminal 79 through the addition unit 77c.

In performing the superimposing display of the OSD video, the OSD signal generation unit 73b generates the OSD signal, and the sub-scaling process unit 77b performs the scaling process to the OSD signal. The addition unit 77c adds the OSD signal, outputted from the sub-scaling process unit 77b, to the digital video signal outputted from the main scaling process unit 77a. Then, the digital video signal is derived from the output terminal 79.

Figure 5:
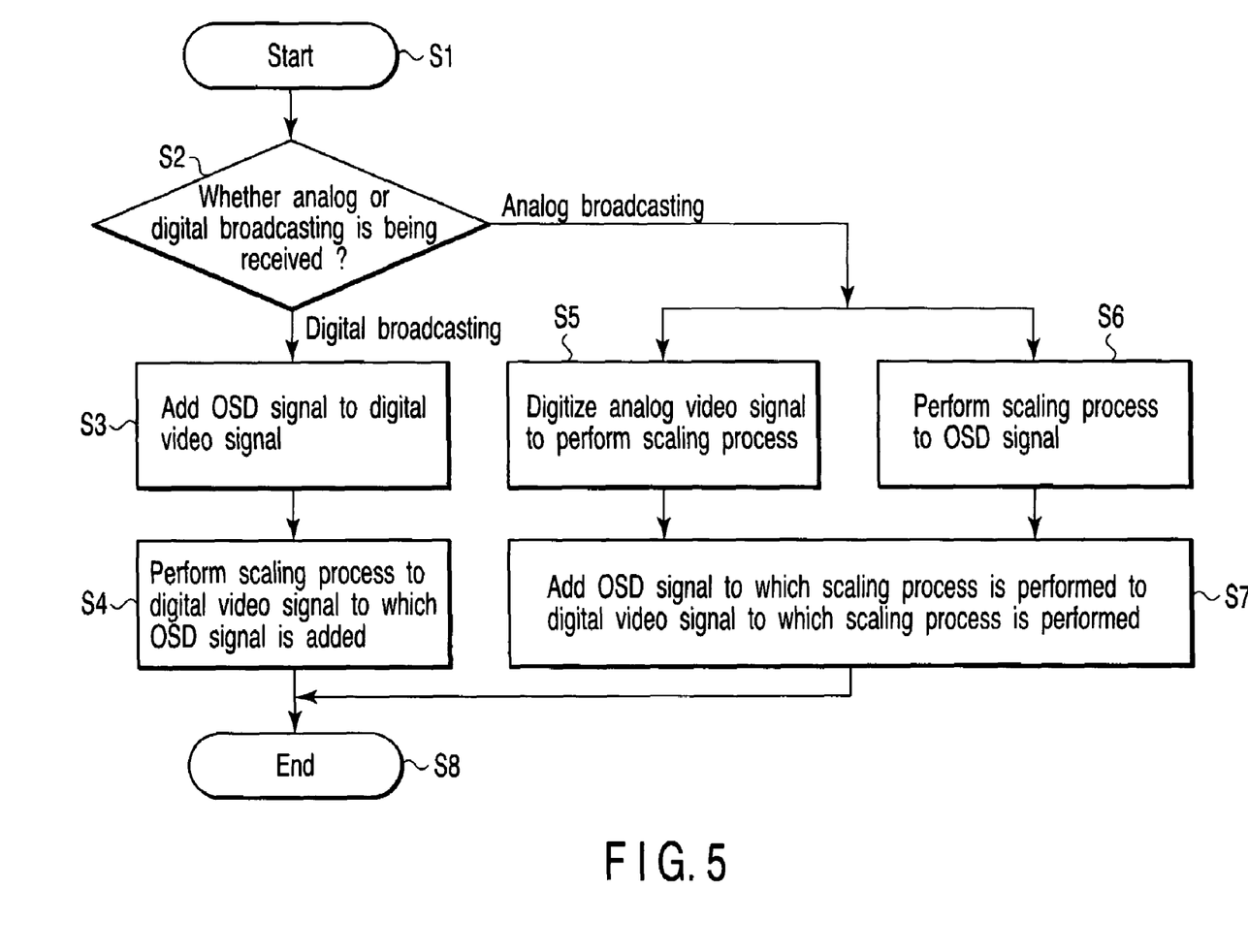
FIG. 5 is a flowchart showing an operation of the OSD scaling process unit of the digital television broadcasting receiver in the embodiment.

FIG. 5 shows a flowchart for explaining an operation in which the OSD signal is added. When a user performs the operation for demanding the OSD display in receiving, for example, the digital broadcasting or the analog television broadcasting, the operation is started (Block S1).

In Block S2, the control unit 59 determines whether the digital broadcasting or the analog television broadcasting is being received. When the control unit 59 determines that the digital broadcasting is being received, in Block S3 the control unit 59 causes the OSD signal generation unit 73b to output the OSD signal for displaying the OSD video corresponding to the user demand, and the control unit 59 causes the OSD signal generation unit 73b to add the OSD signal to the digital video signal outputted from the decoding processing unit 73a.

In Block S4, the control unit 59 supplies the digital video signal to which the OSD signal is added to the main scaling process unit 77a, the main scaling process unit 77a performs the predetermined scaling process to the digital video signal, and the digital video signal is outputted from the output terminal 78. Then, the process is ended (Block S8). Accordingly, the scaling process can be performed to the digital video signal obtained by receiving the digital broadcasting, while the OSD signal can be added to the digital video signal.

When the control unit 59 determines that the analog television broadcasting is being received in Block S2, in Block S5 the control unit 59 causes the A/D conversion unit 76 to convert the analog video signal into the digital video signal, and the control unit 59 causes the main scaling process unit 77a to perform the scaling process to the digital video signal. In Block S6, the scaling process is performed to the OSD signal outputted from the OSD signal generation unit 73b in order to display the OSD video corresponding to the user demand. In Block S7, the control unit 59 causes the addition unit 77c to add the OSD signal to the digital video signal. Then, the process is ended (Block S8). Accordingly, the scaling process can be performed to the video signal obtained by receiving the analog television broadcasting, while the OSD signal can be added to the video signal.

Figure 6:
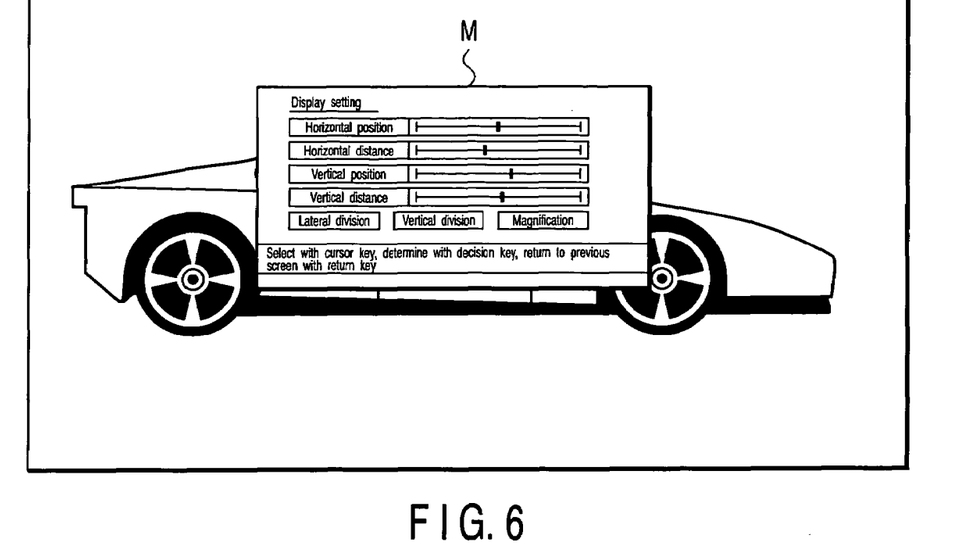
FIG. 6 is a view for explaining an example of a screen displayed by the digital television broadcasting receiver in the embodiment.

FIG. 6 shows an example in which a menu screen M is superimposed on the display video of the analog television broadcasting by OSD. In this case, the menu screen M is displayed in the center of the screen.

According to the embodiment, the digital video signal outputted from the decoding processing unit 73a or the digital video signal outputted from the A/D conversion unit 76 is supplied to the main scaling process unit 77a, and the main scaling process unit 77a performs the scaling process. Therefore, the high-quality scaling process can be performed to the broadcasting video signal or the inputted original video signal, and degradation of the image quality can be prevented.

The A/D conversion unit 76 digitizes the analog video signal, the main scaling process unit 77a performs the scaling process to the digital video signal, and the OSD signal from the sub-scaling process unit 77b is added to the digital video signal. Therefore, the delay amount can be decreased.

In the case where the OSD signal is added to the analog video signal, generally the analog video signal is digitized, the digital video signal is supplied to the decoder unit 73, and the OSD signal is added after the decoding process. However, originally it is not necessary that the decoding processing unit 73a perform the decoding process to the analog video signal, and it takes a long time to perform the decoding process. Therefore, the degradation of the image quality and the large delay are generated.

On the contrary, in the embodiment, it is not necessary that the analog video signal pass through the decoder unit 73. Therefore, while the degradation of the image quality can also be prevented on this point, the video display can be performed without generating the large delay.

For the analog video signal and the OSD signal, the scaling process is individually and independently performed such that the main scaling process unit 77a performs the scaling process to the analog video signal while the sub-scaling process unit 77b performs the scaling process to the OSD signal. That is, the scaling process can be performed to the OSD signal independently of the number of pixels of the received video of the analog television broadcasting.

Therefore, even if the panels having various numbers of pixels such as wide extended graphics array (WXGA), XGA, wide video graphics array (WVGA), and 720p (progressive) are used as the video display unit 14, the OSD signal previously prepared for the panel having the particular number of pixels (for example, 1080i (interlace)) can directly be utilized with no correction.

Figure 7:
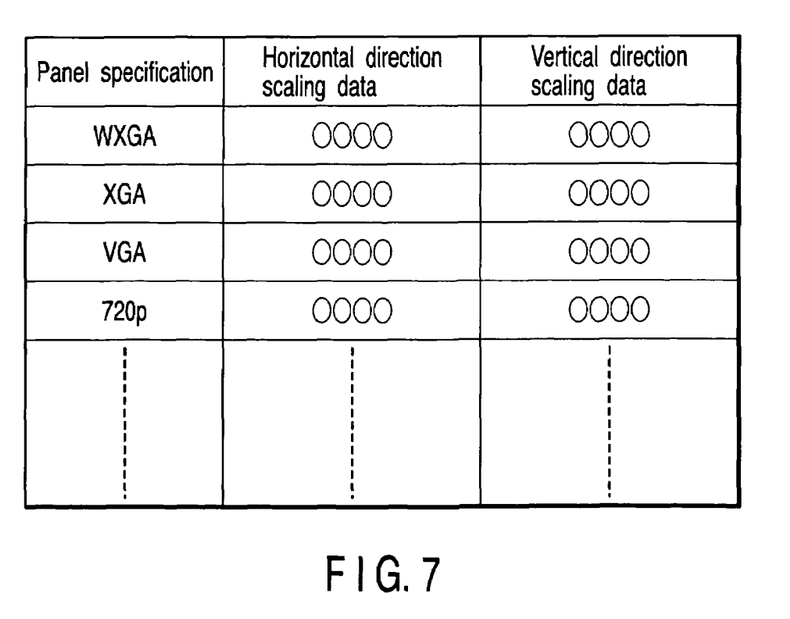
FIG. 7 is a view for explaining a table, set in the digital television broadcasting receiver in the embodiment and performing scaling of an OSD signal according to the number of pixels of a display panel.

In the case where the OSD signal generation unit 73b generates the OSD signal corresponding to the panel having the number of pixels of 1080i, as shown in FIG. 7, a table is stored in the ROM 60 in order to display the OSD signal on the panels having the various numbers of pixels. The table is set while panel specifications are correlated with horizontal direction scaling data and vertical direction scaling data.

The corresponding horizontal direction scaling data and vertical direction scaling data are taken out from the table according to the number of pixels of the used panel in the video display unit 14, and the horizontal direction scaling data and vertical direction scaling data are set in the sub-scaling process unit 77b. Therefore, the sub-scaling process unit 77b performs the scaling process to the OSD signal outputted from the OSD signal generation unit 73b based on the set scaling data, and the OSD signal to which the scaling process is performed is displayed on the panel.

Thus, the scaling process can be performed to the OSD signal independently of the analog video signal, which allows the OSD signal prepared for the panel having the particular number of pixels to be also used for the panels having other numbers of pixels. Therefore, it is efficient because the OSD signal corresponding to each of the panels having the various numbers of pixels is not required.

The scaling process is individually and independently performed to the analog video signal and the OSD signal, so that the magnification and contraction or movement of the display position can freely be performed to the video by the analog video signal and the OSD video by the OSD signal.

With reference to the change in display setting, the user operates the menu key 17p of the remote controller 17 to display a menu screen, and the user goes deep into various hierarchical menu screens from the menu screen to display the display setting screen. The change in display setting can be realized by setting the magnification and contraction or the display position on the display setting screen.

Figure 8:
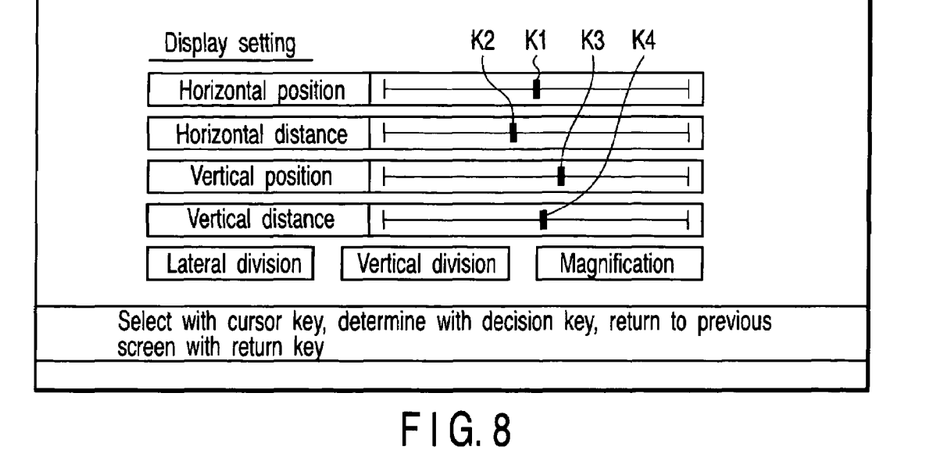
FIG. 8 is a view for explaining an example of a display setting screen displayed by the digital television broadcasting receiver in the embodiment.

FIG. 8 shows the display setting screen. Seven items of "Horizontal position," "Horizontal distance," "Vertical position," "Vertical distance," "Lateral division," "Vertical division," and "Magnification" are displayed in the display setting screen. The items are selected by operating the cursor key 17f of the remote controller 17, and the decision is made by operating the decision key 17g.

For example, by selecting and determining the item of "Horizontal position", a cursor K1 displayed on the right side of the item can be moved from side to side by operating the cursor key 17f. The scaling data supplied to the sub-scaling process unit 77b is varied such that the horizontal direction display position of the OSD video is changed in association with the movement of the cursor K1.

By selecting and determining the item of "Horizontal distance", a cursor K2 displayed on the right side of the item can be moved from side to side by operating the cursor key 17f. The scaling data supplied to the sub-scaling process unit 77b is varied such that the horizontal direction distance (width) of the OSD video is changed in association with the movement of the cursor K2.

By selecting and determining the item of "Vertical position", a cursor K3 displayed on the right side of the item can be moved from side to side by operating the cursor key 17f. The scaling data supplied to the sub-scaling process unit 77b is varied such that the vertical direction position of the OSD video is changed in association with the movement of the cursor K3.

By selecting and determining the item of "Vertical distance", a cursor K4 displayed on the right side of the item can be moved from side to side by operating the cursor key 17f. The scaling data supplied to the sub-scaling process unit 77b is varied such that the vertical direction distance (height) of the OSD video is changed in association with the movement of the cursor K4.

Figure 9A:
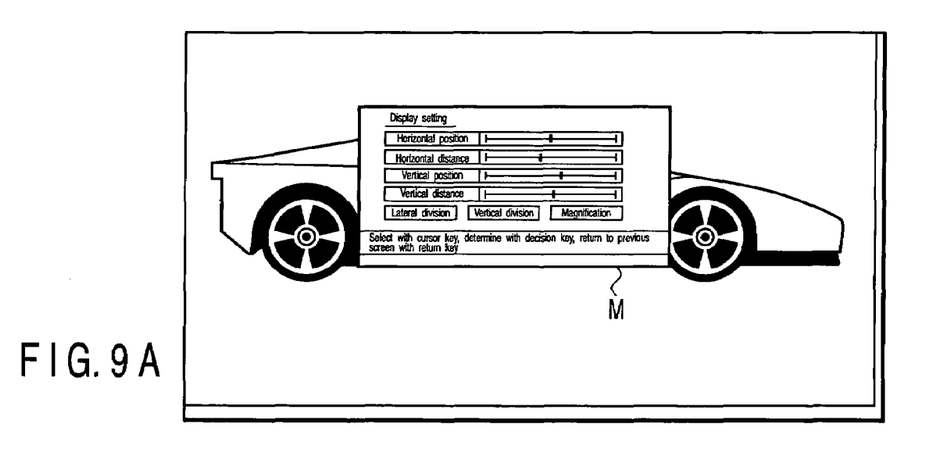
FIGS. 9A and 9B are views for explaining an example of the screen set by the display setting screen in the embodiment.
Figure 9B:
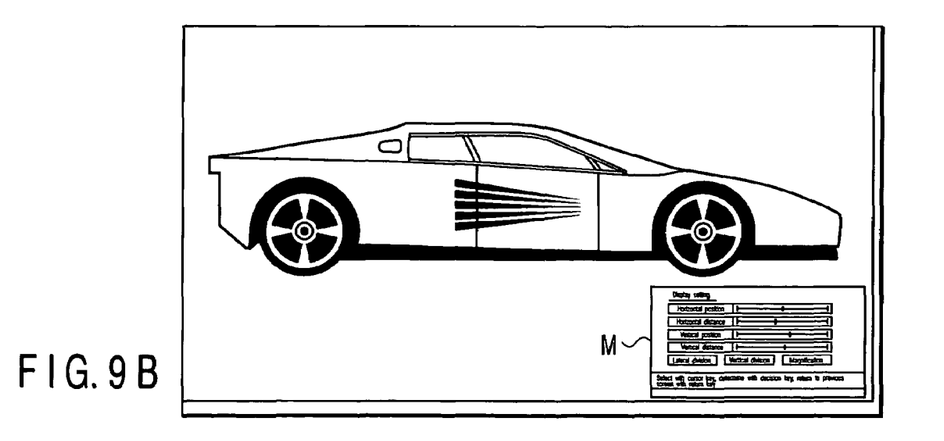

The horizontal position, the horizontal distance, the vertical position, and the vertical distance are set in the above-described manner respectively. Therefore, the menu screen M which is the OSD video displayed in the center of the screen as shown in FIG. 9A can be displayed while contracted in the lower right of the screen as shown in FIG. 9B.

Figure 10:
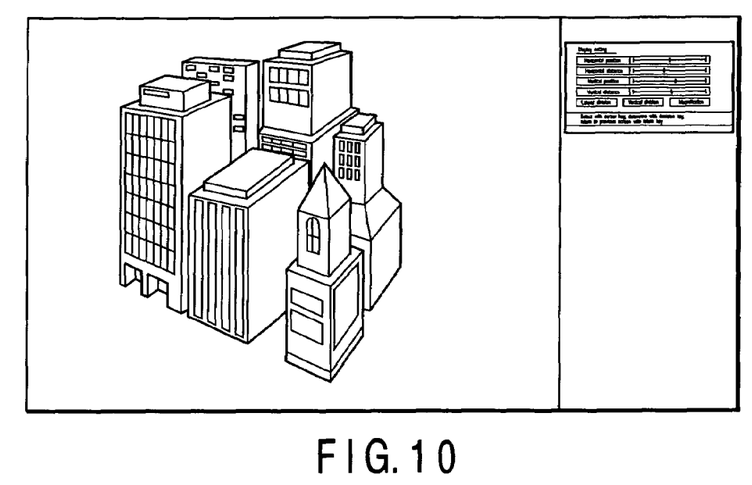
FIG. 10 is a view for explaining another example of the screen set by the display setting screen in the embodiment.

The item of "Lateral division" is selected and determined on the display setting screen, which allows the scaling data supplied to the main scaling process unit 77a and the sub-scaling process unit 77b to be varied such that the analog broadcasting video and the menu screen M which is the OSD video are displayed while laterally divided on the screen as shown in FIG. 10.

Figure 11A:
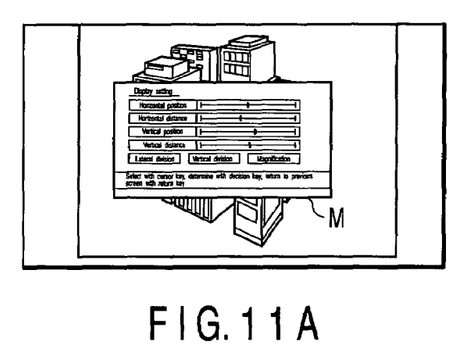
FIGS. 11A and 11B are views for explaining another example of the screen set by the display setting screen in the embodiment.
Figure 11B:
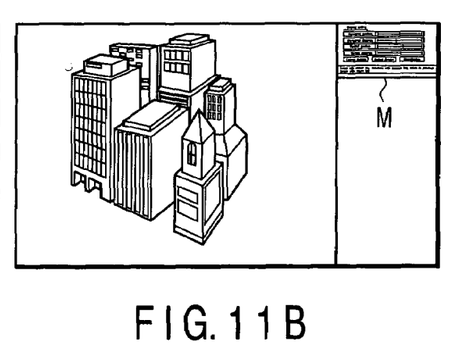

In the lateral division, in the case where the analog broadcasting video is displayed in a pan-and-scan mode including side panels (black portions) on both sides as shown in FIG. 11A, the black portions on both sides can be collected onto the right side as shown in FIG. 11B to display the menu screen M in the black portion on the right side.

Figure 12A:
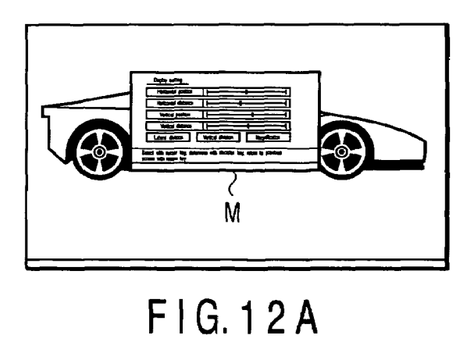
FIGS. 12A and 12B are views for explaining another example of the screen set by the display setting screen in the embodiment.
Figure 12B:
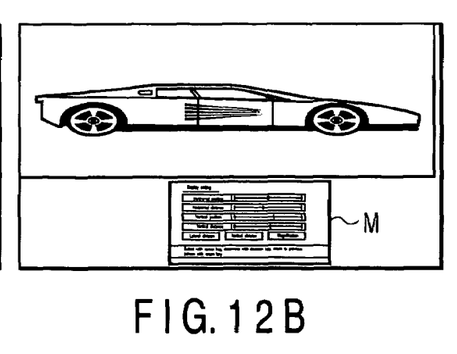

The item of "Vertical division" is selected and determined on the display setting screen. This allows the scaling data supplied to the main scaling process unit 77a and the sub-scaling process unit 77b to be varied such that the analog broadcasting video and the menu screen M, which is the OSD video, while displayed in the superimposing manner as shown in FIG. 12A can be displayed while vertically divided on the screen as shown in FIG. 12B.

Figure 13:
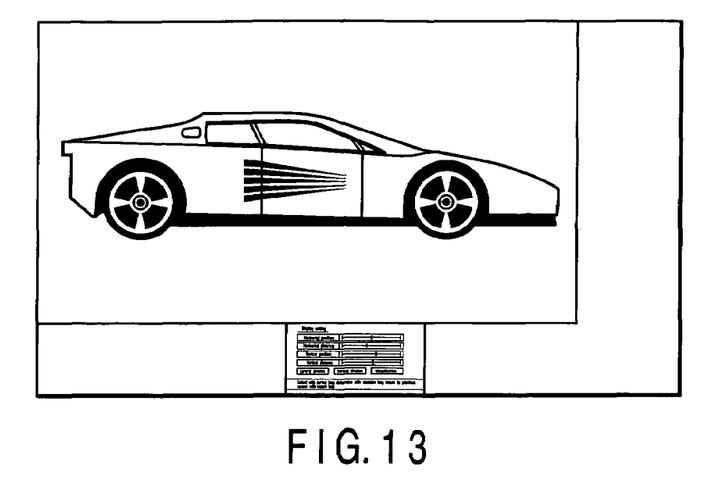
FIG. 13 is a view for explaining still another example of the screen set by the display setting screen in the embodiment.

In the vertical division, in order to prevent the analog broadcasting video from being displayed while vertically contracted, as shown in FIG. 13, the analog video can also be displayed with a normal aspect ratio by inserting the black portion into right side of the screen.

Figure 14A:
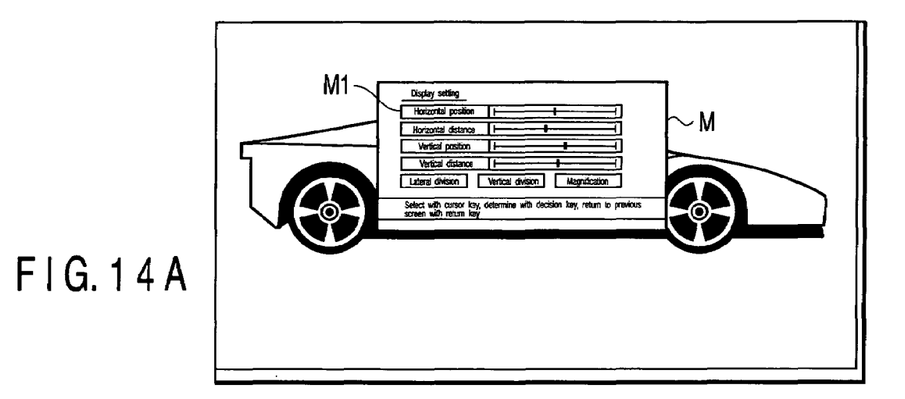
FIGS. 14A and 14B are views for explaining still another example of the screen set by the display setting screen in the embodiment.
Figure 14B:
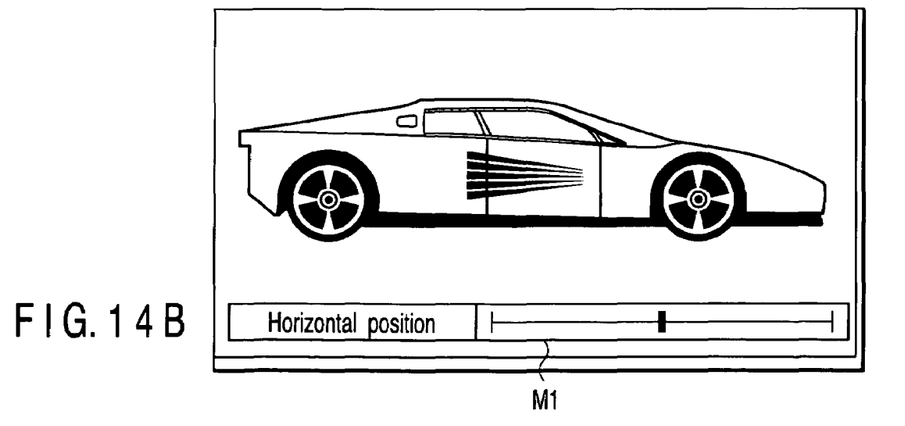

The item of "Magnification" is selected and determined on the display setting screen. Then, a part M1 of the menu screen M which is the OSD video displayed while superimposed on the analog broadcasting video as shown in FIG. 14A can be displayed while magnified as shown in FIG. 14B.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video signal processing apparatus comprising:
    a processing unit configured to perform a decoding process to an inputted digital video signal to add a digital OSD signal, the digital OSD signal being set for display on a panel having the particular number of pixels;
    a conversion unit configured to digitize an inputted analog video signal;
    a scaling unit configured to selectively perform a first scaling process to the digital video signals outputted from the processing unit and the conversion unit while performing a second scaling process to the OSD signal, the scaling unit adding the OSD signal to which the second scaling process is performed to the digital video signal to which the first scaling process is performed outputted from the conversion unit; and
    a scaling data change unit configured to change display modes of the digital video signal and the OSD signal by causing pieces of scaling data to be variable based on a predetermined operation, the pieces of scaling data being supplied for the first and second scaling processes.

2. A video signal processing apparatus according to claim 1, wherein the scaling data change unit comprises:
    a display unit configured to display a setting screen in which an operation for setting display sizes or display positions of the digital video signal and OSD signal is performed; and
    a control unit configured to supply the scaling data for each of the first and second scaling processes, the scaling data corresponding to the display size or display position set by the setting screen displayed on the display unit.

3. A video signal processing apparatus according to claim 1, wherein the processing unit comprises:
    a decoding processing unit configured to perform the decoding process to the inputted digital video signal;
    a generation unit configured to generate the OSD signal; and
    a first addition unit configured to add the OSD signal, generated by the generation unit, to the digital video signal to which the decoding process is performed by the decoding processing unit.

4. A video signal processing apparatus according to claim 1, wherein the scaling unit comprises:
    a first scaling process unit configured to selectively perform the first scaling process to the digital video signals outputted from the processing unit and the conversion unit;
    a second scaling process unit configured to perform the second scaling process to the OSD signal; and
    a second addition unit configured to add the OSD signal, outputted from the second scaling process unit, to the digital video signal outputted from the first scaling process unit, the first scaling process being performed to the digital video signal outputted from the conversion unit.

5. A video signal processing method comprising:

a first step of performing a decoding process to an inputted digital video signal when the digital video signal is inputted, adding a digital OSD signal set for display on a panel having the particular number of pixels to the digital video signal, and performing a first scaling process and outputting the digital video signal;

a second step of digitizing an inputted analog video signal to perform the first scaling process when the analog video signal is inputted, and adding the OSD signal to which a second scaling process is performed; and a third step of changing display modes of the digital video signal and the OSD signal by causing pieces of scaling data to be variable based on a predetermined operation, the pieces of scaling data being supplied for the first and second scaling processes.

6. A video signal processing method according to claim 5, wherein the third step comprises:

a step of displaying a setting screen in which an operation for setting display sizes or display positions of the digital video signal and OSD signal is performed; and a step of supplying the scaling data for each of the first and second scaling processes, the scaling data corresponding to the display size or display position set by the setting screen displayed on the display unit.

7. A video signal processing method according to claim 5, wherein the first step comprises:

a step of performing the decoding process to the inputted digital video signal;

a step of generating the OSD signal;

a step of adding the generated OSD signal to the digital video signal to which the decoding process is performed; and a step of performing the first scaling process to the digital video signal to which the OSD signal is added.

8. A video signal processing method according to claim 5, wherein the second step comprises:

a step of digitizing the inputted analog video signal;

a step of performing the first scaling process to the digitized video signal;

a step of performing the second scaling process to the OSD signal; and a step of adding the OSD signal to the digital video signal, the second scaling process being performed to the OSD signal, the first scaling process being performed to the digital video signal.

9. A broadcasting receiver comprising:

a receiving unit configured to receive a digital or analog broadcasting signal;

a generation unit configured to generate a digital or analog video signal from the digital or analog broadcasting signal received by the receiving unit;

a processing unit configured to perform a decoding process to the digital video signal, generated by the generation unit, to add a digital OSD signal to the digital video signal, the digital OSD signal being set for display on a panel having the particular number of pixels;

a conversion unit configured to digitize an inputted analog video signal;

a scaling unit configured to selectively perform a first scaling process to the digital video signals outputted from the processing unit and the conversion unit while performing a second scaling process to the OSD signal, the scaling unit adding the OSD signal to which the second scaling process is performed to the digital video signal to which the first scaling process is performed outputted from the conversion unit; and a scaling data change unit configured to change display modes of the digital video signal and the OSD signal by causing pieces of scaling data to be variable based on a predetermined operation, the pieces of scaling data being supplied for the first and second scaling processes.

* * * * *